United States Patent [19]

Drach

[11] 4,420,368

[45] * Dec. 13, 1983

[54] LATEX BINDERS FOR FIBROUS WEBS

[75] Inventor: John E. Drach, Montgomery County, Pa.

[73] Assignee: Scott Paper Company, Philadelphia, Pa.

[*] Notice: The portion of the term of this patent subsequent to Jul. 5, 2000 has been disclaimed.

[21] Appl. No.: 286,077

[22] Filed: Jul. 24, 1981

[51] Int. Cl.³ ............................................. D21H 3/38
[52] U.S. Cl. ..................................... 162/8; 162/168.2
[58] Field of Search ................. 162/8, 168.2; 428/290

[56] References Cited

U.S. PATENT DOCUMENTS

| | | |
|---|---|---|
| 2,886,557 | 5/1959 | Talet . |
| 2,999,038 | 9/1961 | Drenner et al. . |
| 3,017,291 | 1/1962 | McLaughlin . |
| 3,555,585 | 1/1971 | Cuculo ............................... 8/116.2 |
| 3,816,238 | 6/1974 | Mitchell ................................. 162/8 |
| 4,158,594 | 6/1979 | Becker et al. ....................... 162/112 |
| 4,199,643 | 4/1980 | Falgiatore et al. ................. 428/290 |

FOREIGN PATENT DOCUMENTS

| | | |
|---|---|---|
| 997091 | 9/1976 | Canada . |
| 45-41609 | 12/1970 | Japan . |
| 49-90390 | 8/1974 | Japan . |

OTHER PUBLICATIONS

Cuculo, J. A., "Textile Research Journal", vol. 41, pp. 321-326; 375-378, vol. 43, pp. 283-293, vol. 45, 314-316, vol. 46, 393-397.

*Primary Examiner*—William F. Smith
*Attorney, Agent, or Firm*—John A. Weygandt

[57] ABSTRACT

Latices which contain an addition polymer comprising an ethylenically unsaturated amic acid and at least one other ethylenically unsaturated monomer are used as binders for fibrous webs to impart wet and dry strength.

11 Claims, No Drawings

LATEX BINDERS FOR FIBROUS WEBS

BACKGROUND OF THE INVENTION

1. Field of the Invention

This invention relates to a latex binder for cellulosic, fibrous webs which, after application and cure, imparts wet and dry strength to the web. Thereafter the fibers in the web can be recovered for reuse in a subsequent web-making process if desired, because the bonded fibers can be readily unbonded or separated by a repulping process. The fiber recovery (repulping of broke) can be achieved under conditions similar to those normally employed by the paper industry for repulping conventional wet-strengthened webs (e.g. strengthened with wet strength resins) without significant degradation of any of the fiber's useful properties. The binder of the present invention is an aqueous latex containing an addition polymer comprising ethylenically unsaturated amic acid and at least one other ethylenically unsaturated monomer.

2. Prior Art

Conventional latices, such as those employed in a papermaking process disclosed in U.S. Pat. No. 4,158,594, cannot be repulped to recover the fibers in the paper under conventional repulping conditions because the severe repulping conditions needed to chemically attack the latex would destroy the cellulosic fibers. Conventional latex binders for fibrous webs were therefore classified as "non-repulpable" because webs treated with them could be repulped only with extreme difficulty by reason of their strong resistance to hydrolytic depolymerization or solubilization. This is understandable since such latices have evolved from polymers designed for use in water-based latex paints such as house paints where hydrolysis or depolymerization of the paint after drying is meticulously avoided. This resistance to hydrolysis after drying and curing of the latex is achieved by crosslinking of the latex polymers upon curing.

Self-crosslinking latices usually offered in commerce are essentially copolymers and terpolymers of acrylic and methacrylic esters, vinyl esters, olefins, acrylic and methacrylic acids, maleic and fumaric acids, vinylbenzenes, vinylnitriles and N-methylolvinylamides in various combinations and proportions with the N-methylolvinylamide being the source of their self-crosslinking or curing characteristic. An example of such a binder is a latex derived from vinylacetate, ethylene and N-methylolacrylamide. The N-methylolacrylamide (or N-methylolmethacrylamide) contributes a pendant self-crosslinking functionality which does not react until activated by elevated temperature and low pH.

The stability and durability of the crosslinks which form when the latices are cured depends upon the chemical nature of the crosslinks. Methylene crosslinks, as obtained with N-methylol acrylamide monomers incorporated into the latex polymer in conventional latices such as formed when N-methylolvinyl amides (self-crosslinking) or vinyl amides and trimethylolmelamine or vinyl amides and formaldehyde (crosslinkable), are especially inert to alkaline hydrolysis and require a repulping or broking operation which is impracticable or costly.

The nature of such methylene crosslinks is depicted in FIG. 1.

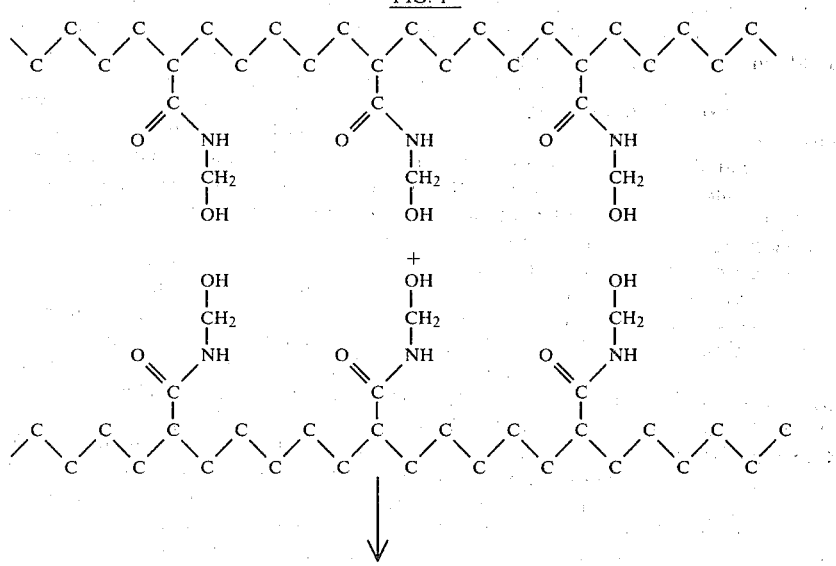

FIG. 1

FIG. 1
-continued

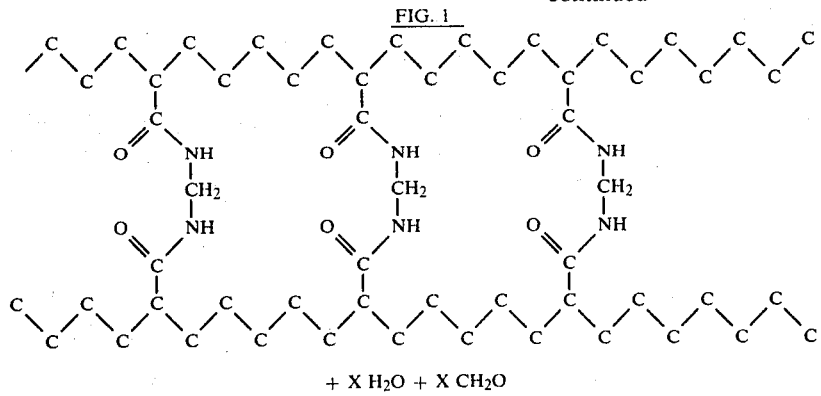

+ X H₂O + X CH₂O

Latices of the nature shown in FIG. 1, usually require excessive amounts of alkali (10-12% sodium hydroxide by weight of fiber) at temperatures from about 200°-220° F. for 2 hours or more in order to effect fiberization (separation of the web into individual fibers). Such severe conditions are detrimental to most natural fibers and to many synthetic fibers resulting in fiber losses of about 15-20%. In addition, degradation products from the cellulosic fibers increase the amount of biodegradable matter in the spent repulping liquor, thereby necessitating costly treatment of the effluent or waste streams.

Recently, it has become desirable to eliminate the use of formaldehyde-based latices as binders for fibrous webs because of the known and suspected toxic effects of formaldehyde. Examples of such formaldehyde-based latices are those which employ N-methylolacrylamide and/or N-methylolmethacrylamide as the source of their self-crosslinking or curing ability. The N-methylol functionality is a latent source of formaldehyde because formaldehyde is released during the curing or crosslinking reaction. The crosslinking reaction between two polymer chains involves the condensation of pendent N-methylol functionalities to form bis-methylene amide crosslinks and formaldehyde.

It is known in the art of making self-crosslinking latices to eliminate the known and potential hazards of formaldehyde-containing latices to make latices whose copolymers contain functional groups capable of reacting with innocuous polyaldehydes such as glyoxal. These systems take advantage of the reaction between amide groups on separate polymer chains and a polyfunctional aldehyde to crosslink the chains. Talet, U.S. Pat. No. 2,886,557, describes the preparation of a crosslinked acrylamide polymer by reaction of a vinyl acetate-acrylamide-containing latex copolymer with glyoxal. Falgiatore et al, in U.S. Pat. No. 4,199,643, describe the preparation of a latex binder which contains a copolymer comprised of ethylenically unsaturated monomers copolymerized with an ethylenically unsaturated vinyl amide—the amide group of which is monofunctionally bonded to a polyaldehyde.

These mono-functionalized aldehyde groups can subsequently react with non-functionalized amide groups to produce a crosslinked polymer after application to the binder to textiles and/or paper. Mackower et al, in Canadian Pat. No. 997,091, describe the preparation and use of cellulose-substantive, glyoxalated latex binders containing polymerizable vinyl amide monomers in their latex copolymers. The reported latices contain copolymers comprised of a vinyl amide and at least one other ethylenically unsaturated monomer. The latex copolymer is at least partially reacted with glyoxal prior to application to the wet end of a paper machine.

A way of avoiding the use of formaldehyde in latex binders which are for application to cellulosic materials is to incorporate into the latex copolymer groups which will react with cellulose thereby affixing the latex copolymer to the cellulosic material.

The general reaction between beta-amic acids and alcohols to form half-acid esters was described by Cuculo in a series of publications in the Textile Research Journal, Volume 41 pages 321-326; Volume 41 pages 375-378; volume 43 pages 283-293; volume 45 pages 314-316; volume 46 pages 393-397. These publications describe the preparation of half-acid esters of cellulose by the facile reaction of beta-amic acids and cellulosic hydroxyl groups.

U.S. Pat. No. 3,555,585 granted to Cuculo on Jan. 19, 1971 describes the preparation of cellulose half-acid esters by reaction of beta-carbamyl or gamma carbamyl acids with cellulose. The disclosure is concerned with modification of non-woven, cellulosic webs to yield disposable fabrics by the formation of cellulose half-acid esters through the reaction of the cellulosic fabric with a carbamyl substituted organic acid.

Kimura, in Japanese Patent Disclosure No. 74 90,390 published Aug. 29, 1974, describes a process for the preparation of acrylic copolymers for use as textile finishing agents. The acrylic copolymers described in this invention are prepared in an aqueous latex and contain acrylic monomers and/or other ethylenically unsaturated monomers and unsaturated amic acids such as maleamic acid. When the latices as described in the invention are used as textile finishing agents, they exhibit outstanding resistance to dry cleaning. The superior dry cleanability of these latices is attributed to the existence of the strong fiber-copolymer bonds formed by the reaction of the amic acid pendent functionalities of the latex copolymer and the cellulose molecules of the cotton fabric. The strong fiber-copolymer bonds are the result of an intramolecular esterification between the latex copolymer and the cellulose of the cotton fabric. These ester linkages are insensitive to the action of dry cleaning solvents such as percholoroethylene. The present inventor has found that the latices described by Kimura for improving dry cleanability of textile fabrics are useful for imparting wet strength to cellulosic webs. Not only does Kimura fail to disclose or suggest such a utility but, moreover, the papermaking art has been in the possession of closely related copolymers without recognizing the value of the ester linkages in providing wet strength to paper webs.

U.S. Pat. No. 3,017,291 granted Jan. 16, 1962 to McLaughlin et al describes the use of emulsion copolymers containing an acid, such as maleic or aconitic, and their salts, as wet strength resins. This patent at Column 1, lines 36-39 contains the naked suggestion that salts of partial amides, such as the salt of maleamic acid, can be produced by neutralization of the emulsion copolymers of the patented invention with ammonia and amines. While there is no subsequent enabling disclosure or teaching in respect of such salts merely named by McLaughlin et al, neutralization, as normally understood by one of ordinary skill in the art and in accordance with the disclosure of an antecedent patent assigned to the same assignee, U.S. Pat. No. 2,999,038, at Column 2, lines 50-54, means that aqueous alkali, particularly ammonia, is added to the copolymer. The resulting compound, in the case hypothesized by McLaughlin et al would contain the diammonium salt of maleic acid, not the salt of a half-acid, half-amide characteristic of a salt of maleamic acid.

SUMMARY OF THE INVENTION

Self-crosslinking latices have been used in papermaking and the manufacture of other nonwoven products to impart strength, particularly wet strength, to the product so that the web does not disintegrate into the individual fibers comprising the web. To accomplish this, the latices are added to the web during the manufacturing process while the latices are in an uncured condition. Upon drying and curing, the latices develop crosslinking bonds between polymer molecules which cures the latex and imparts strength and integrity to the latex so that it can resist hydrolysis and depolymerization when exposed to water or some chemicals. This curing of the latex through crosslinking is the same mechanism by which a latex paint is transformed from a water dispersion of latex chemicals to a solid film of the latex polymers after drying of the latex paint. Because of the crosslinking, the cured latex film does not redisperse when wet with water. This ability to develop a strong crosslinking bond to resist depolymerization after curing of the latex is critical in order for the latex to develop wet strength. Previously much research has been devoted towards increasing the strength of the cured latex and its resistance to chemical attack.

In papermaking, a dichotomy exists between the wet strength requirements for the cured latex on the paper and the need to destroy the wet strength of the latex so as to break the web into its individual fibers for recovery of the fibers and their reuse. In any papermaking operation, typically there are significant amounts of off-specification products that are recycled in the papermaking operations by repulping the product into its original fibers for reuse. If a latex that develops strong crosslinking bonds which resist hydrolysis and chemical attacks (such as a latex developed for paint formulations) is used, then the repulping of the off-specification product is made very difficult because the individual fibers cannot be broken free from the latex bonding material because the latex resists weakening and depolymerization due to the strong crosslinking bonds. Under the more severe repulping conditions needed to depolymerize such strongly crosslinked latices, the fragile cellulosic fibers tend to be destroyed. Conversely, a latex that develops a weakly crosslinked bond may not have sufficient wet strength for the finished product to have adequate functionality when wet. For example, a latex reinforced paper towel may not have adequate wet strength to function when wet if the latex did not develop adequate wet strength through crosslinking. The present invention solves the problem of imparting adequate wet strength to paper through a cured latex bond while achieving depolymerization of the latex under repulping conditions that are mild enough to prevent substantial degradation of the cellulosic fibers so that the fibers can be recovered and reused when necessary.

This invention provides latex binders for cellulosic webs that impart both dry and wet strength to the web, give acceptable wet to dry cross-directional tensile ratios (0.3 to 0.6) and are repulpable under mild conditions.

It is also the teaching of this invention that such latex binders contain polymers which are the product of an ethylenically unsaturated amic acid and at least one other ethylenically unsaturated monomer.

The ethylenically unsaturated amic acid which is a useful latex copolymer component is a polymerizable half-acid, half-amide of the following general formula:

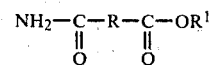

wherein R is a hydrocarbon chain containing a multiple bond capable of radical polymerization and $R^1$ is H, alkyl or alkenyl.

The amount of amic acid which can be used with other monomeric species to make up the desired polymer in the latex binder can be from about 1 to about 20% by weight of the total monomer charge, while about 2 to 10% by weight of the total monomer charge is the preferred amount.

The latices of this invention are preferably prepared from one or more polymerizable, ethylenically unsaturated monomers in addition to the polymerizable amic acid. Such monomers include acrylic and methacrylic esters, amides, substituted amides, nitriles and acids, vinylacetate and other vinyl esters, vinyl ethers and ketones, acrolein, maleic anhydride, maleic and fumaric esters and acids, styrene and substituted styrenes, vinyl pyridines, ethylene, butadiene, itaconic acid and its lower alkyl esters, itaconamide and N-alkylamides, N-vinylpyrrolidone, polymerizable derivatives of allyl alcohol, vinylacetic acid and the like. The emulsion polymerization of these monomers to yield latices can be accomplished by well known emulsion polymerization techniques as described in such chemistry texts as POLYMER SYNTHESES, Volume I and II, by Stanley R. Sandler and Wolf Karo, Academic Press, New York and London, (1074), and PREPARATIVE METHODS OF POLYMER CHEMISTRY, second edition, by Wayne R. Sorenson and Tod W. Campbell, Interscience Publishers (John Wiley & Sons), New York (1968).

The latex binders prepared as described in this disclosure may be applied to nonwoven webs, such as dry-laid or wet-laid fibrous webs comprising natural or synthetic cellulosic fibers or combinations of such fibers, by any conventional technique for applying a latex to a nonwoven web such as printbonding, size press application or by spraying the structure to be strengthened. As will be appreciated by one of ordinary skill in the art to which the present invention pertains, minor proportions of non-cellulosic fibers, such as polyester or polypropylene, can be included in the nonwoven web, particularly a dry-laid web, without departing from the gist of this invention. Typical methods for using elastomeric material to bond fibrous webs are disclosed in said U.S. Pat. Nos. 4,158,594 and 3,879,257. The amount of latex polymer added to the web may be varied depending upon the degree of strengthening desired. From about 3 to 20% latex based upon the weight of the fiber is suitable for many purposes depending upon the amount of wet and dry strength desired and the composition and length of the fibers in the web. The preferred amount of latex to be applied is in the range of about 5 to 15% by weight of the fiber. If so desired, to accelerate the cure (crosslinking) of the polymer after application to the web, mineral acids or salts of acids such as ammonium, magnesium, zinc and tin chlorides, nitrates or sulfates may be added to the latex binder.

Without intending to be bound by theory, the present inventor believes that the crosslinking of the latex polymer molecules with the cellulosic substrate is what produces an increase in the strength characteristics of the bonded web. Prior to the disclosure of this invention, the wet strengthening of webs has been accomplished by the addition of a binder whose polymeric component contained reactive functional groups capable of crosslinking the polymer after it was applied to the web. This invention, however, utilizes the reaction between the pendent amic acid groups of the latex copolymer and the hydroxyl groups of the cellulose molecules of the fibrous web to form a water-insensitive fiber-polymer composite. The resulting composite can have a variety of properties depending upon the composition of the copolymer of the latex binder.

In order to recover the cellulosic fibers of the fiber-polymer composite, (such as rejected web material which had been spoiled in going over the driers or through calendars or the trim-off in the rewinding of roll and trim from sheets being prepared for shipping or the finished product which is perceived to contain manufacturing defects), the latex polymer-cellulose fiber crosslinking reaction that occurred during the curing process must be reversed under conditions which do not harm the fibers yet reduce the web tensile strength back to the original, unbonded value.

DETAILED INFORMATION

The latex polymer composition of this invention comprises a copolymer of an ethylenically unsaturated amic acid and at least one other ethylenically unsaturated monomer. Preferably, the ethylenically unsaturated amic acid is (I) maleamic acid (Z)-4-amino-4-oxo-2-butenoic acid

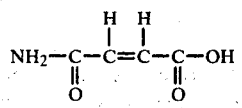

(II) fumaramic acid, (E)-4-amino-4-oxo-2-butenoic acid

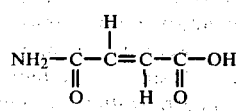

or (III) itaconamic acid, 4-amino-4-oxo-2-methylene butanoic acid

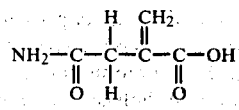

Among the other ethylenically unsaturated monomers useful in this invention are the vinyl esters of aliphatic acids which have one to ten carbon atoms. The preferred vinyl ester is vinyl acetate especially when used with esters of acrylic or methacrylic acids. The acrylate and methacrylate esters of alkyl and cycloalkyl alcohols having one to twenty carbon atoms are most efficacious in forming useful copolymers with vinyl acetate. The preferred esters of methacrylic acid are methyl, ethyl, n-propyl, n-butyl, iso-butyl, 2-ethylhexyl esters. The preferred esters of acrylic acid are methyl, ethyl, n-propyl, n-butyl, iso-butyl, 2-ethyl hexyl with n-butyl being the most preferred.

The most preferred latex polymer composition is a copolymer containing 61% by weight vinyl acetate (a percent of total polymer weight), 32.6% by weight n-butyl acrylate, and 6.4% by weight maleamic acid. The binder containing the preferred composition is prepared by a standard emulsion copolymerization method as outlined in such chemistry texts as mentioned previously; namely POLYMER SYNTHESES, Volume I and II, by Stanley R. Sandler and Wolf Karo, Academic Press, New York and London, (1974), and PREPARATIVE METHODS OF POLYMER CHEMISTRY, second edition, by Wayne R. Sorenson and Tod W. Campbell, Interscience Publishers (John Wiley & Sons), New York (1968).

The wet tensile increase in webs treated with latices prepared as taught in this disclosure is a consequence of the presence of amic acid in the latex copolymer. When such a latex is deposited on a fibrous web, the wet tensile is improved by the reaction of the pendent amide functionality of the amic acid comonomer and a cellulose hydroxyl group forming the water-insensitive, fiber-polymer composite represented in FIG. 11 below.

FIG. II

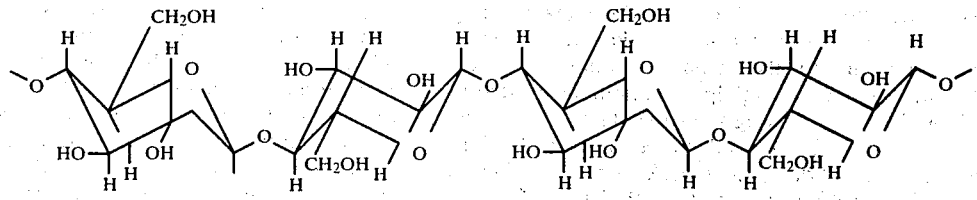

FIG. II -continued

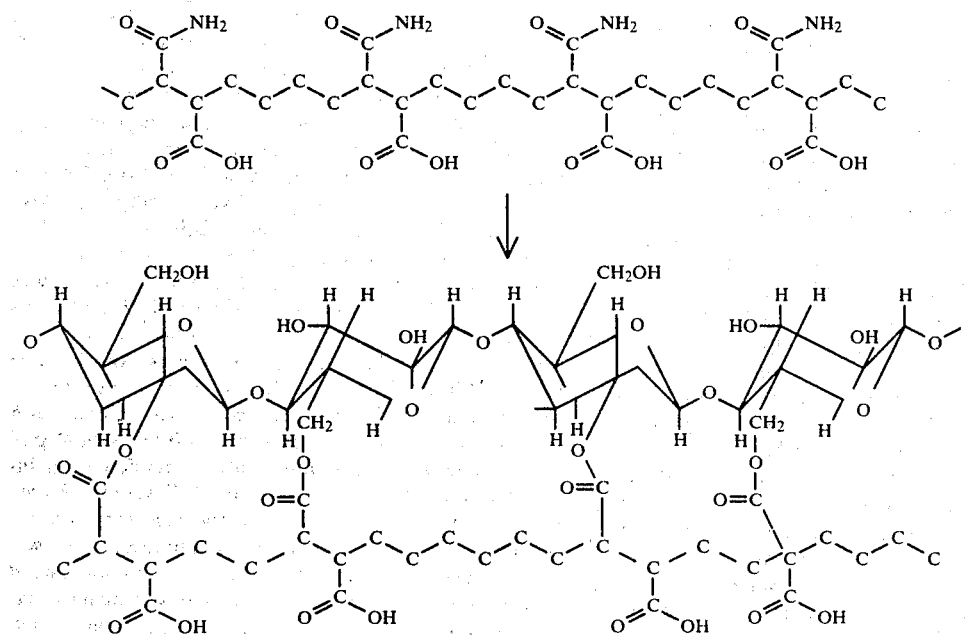

The reaction is facilitated by the presence of a vicinal, pendent carboxyl group which accelerates the rate of the attack of the cellulosic hydroxyl group on the carboxyl carbon of the amide function.

The rate acceleration is due to the anchimeric assistance by the beta-carboxyl group to the reaction of the cellulose hydroxyl with the alpha-amide group. It is known that carboxylic acids participate in amide hydrolysis when the carboxyl group is situated beta to the amide group. Thus a mechanism envisioning the formation of an anhydride-like intermediate followed by attack of the cellulosic hydroxyl on the intermediate to form an ester cross-linkage and ammonia is postulated.

When a cellulosic fibrous web is treated with a latex as taught in this disclosure and cured, the sheet will have a wet to dry cross directional tensile ratio equal to 0.3 to 0.6. If this sheet is then subjected to a repulping or broking operation wherein it is slurried in an aqueous solution containing 1 to 5% sodium hydroxide (NaOH) based on fiber weight at temperature range of 65°–95° C. (150° to 200° F.) it will fiberize in a short period of time ranging from 30 to 60 minutes. Such a mild repulping operation produces a minimum amount of biodegradable matter in the spent repulping liquor thus obviating the need for an expensive effluent treating system to remove the biodegradable matter.

A fibrous web is said to be repulped when it is completely fiberized (separated into individual fibers). Complete fiberization occurs when all fiber clumps have been separated into individual fibers. The degree of difficulty (time, temperature, alkali concentration) required to completely fiberize a latex bound sheet defines the relative ease of repulpability of that sheet. For example, a latex-treated fibrous web would be deemed very easily repulpable if, as a result of a repulping operation, it became completely fiberized in 5 to 30 minutes at approximately 95° C. (200° F.) at 5% consistency using 5% NaOH based on fiber weight. A sheet would be classified non-repulpable if it could not be completely broken down into individual fibers in 3 to 4 hours as a result of a repulping operation at 95° C. (200° F.) at 5% consistency using 5% NaOH based on fiber weight.

Fibrous webs treated with latex binders as described in this invention, having a wet to dry cross directional tensile ratio equal to 0.3 to 0.6, are classifiable by the above standard as easily repulpable. Fibrous webs treated with latex binders whose polymer component contains pendent N-methylol functionalities, latices of the nature shown in FIG. 1, are essentially non-repulpable when measured by the above standard.

Fibrous webs treated with latex binders as disclosed herein are easily repulpable because of the presence of a polymerizable amic acid in the latex copolymer. The amide functionality of the amic acid reacts (cross-links) with the cellulose molecules of the fibrous web forming ester linkages. When the fibrous web is subjected to a repulping operation as described in this disclosure, it is readily fiberized by the action of the aqueous alkali on the fibrous web-latex polymer composite because the ester linkages between molecules (crosslinks) are readily broken (hydrolyzed) by the action of the aqueous alkali. The relative ease of the breaking of the intermolecular ester linkages is quite unexpected in view of the teachings of Japanese Patent Disclosure 74 90,390 that the resistance of acrylic copolymers to dry cleaning is increased by incorporating amido acid derivatives without damaging the various characteristics of acrylic copolymers considered desirable in the textile industry, especially water resistance.

The facility with which the ester crosslinks are broken during a repulping operation can be understood in terms of the unique molecular structure of the amic acid component of the binder copolymer. When the fiber-polymer composite is subjected to hot, aqueous alkali, the ester crosslinks are cleaved rather easily because they are vicinal or immediately adjacent to pendent carboxyl groups. The adjacent carboxyl groups enhance the rate of the hydrolysis of the ester crosslinks.

The presence of the carboxyl group in the amic acid component of the copolymer also facilitates fiberization of the web by rendering the uncrosslinked polymer water-swellable. The carboxyl groups are especially alkali soluble and their presence on the copolymer chain allows the copolymer to become at least water-swellable in the highly alkaline repulping environment.

The rate of fiberization is not as great for webs treated with latex binders whose copolymers do not contain maleamic acid as a comonomer because carboxyl groups have to be produced by the base-promoted hydrolysis of pendent groups such as amides or esters to alkali-swellable carboxylate groups. Fibrous webs treated with latex binders whose polymer component contains pendent N-methylol groups are essentially non-repulpable because the methylene amide interpolymer crosslinks (FIG. 1) are cleaved very slowly or not at all by aqueous alkali. Even if the inter-polymer crosslinks are cleaved, the resulting linear polymer is not easily lifted from the fibrous web until the polymer has been rendered water soluble. This solubilization, via hydrolysis of the pendent ester groups into carboxyl groups, requires strong base at high temperature.

There are two other particular advantages in using latex binders as described in this invention. The first is that there is no formaldehyde present so that none can be released during any web application process or curing step in the treated product. This is an important advantage over self-crosslinking latex binders which contain N-methylol pendent functionalities in their polymer components because the N-methylol group is a latent source of formaldehyde. The elimination of formaldehyde thus assures that users of products made with these amic acid binders, and/or workers involved in producing such products, will not be exposed to formaldehyde and therefore cannot suffer any irritation which might be attributable to it.

Another advantage amic acid-containing latices have over self-cross-linking latices is their long term stability prior to application to fibrous webs. Self-crosslinking latices are prone to instability during long term storage because the latex particles can coalesce due to a crosslinking reaction between polymer molecules on separate latex particles. This type of coalescence is impossible with amic acid containing latices because the amic acid functionalities only react with cellulosic hydroxyl groups after being deposited on a fibrous web.

The following examples further serve to illustrate typical applications of the basic principles of the invention to the bonding of cellulosic fibrous webs.

EXAMPLE 1

Preparation of maleamic acid (Z)-4-amino-4-oxo-2-butenoic acid.

Into a one liter resin kettle equipped with a mechanical stirrer and a thermometer are placed 120 g of 29% aqueous ammonia (2.05 moles) and 500 g of water. To this stirred solution is added 200.9 g of maleic anhydride (2.05 moles) in small increments. The reaction mixture is maintained at 55° C. to 60° C. until the maleic anhydride addition is complete. The reaction mixture is then cooled to room temperature at which time 1295 g of water are added to make a solution which is 11.5% by weight maleamic acid. Maleamic acid isolated from the solution by evaporation of the water yields a white solid which decomposed at 151° C. (Literature value is 150° C.-152° C.)

EXAMPLE II

Preparation of amic acid latex binder-maleamic acid.

A one liter resin kettle is fitted with a thermometer, three addition funnels, a stirrer, and a nitrogen inlet tube. The kettle is charged with 95 g of deionized water, 21.5 g of 70% aqueous octylphenoxypolyethoxy ethanol—30 ethylene oxide units (commercial product trademark Triton X-305; Rohm & Haas Co.), 2.9 g of potassium persulfate, 0.4 g of hydroxyethyl cellulose (commercial product trademark Cellosize WP-09-L; Union Carbide Corporation), 0.35 g of sodium bicarbonate, and 14.5 of monomer mix. The monomer mix consists of 51.5 g of N-butylacrylate and 96 g of vinylacetate. The remaining amount of monomer mix, 130.5 g, is placed in one of the addition funnels. Another one of the addition funnels is filled with 82.0 g of 11.5% maleamic acid solution prepared in accordance with Example 1 and the remaining funnel is filled with 40 g of a 2% aqueous sodium sulfoxylate formaldehyde solution (commercial product trademark Discolite; Royce Chemical Co.). The contents of the reaction flask are surged with dry nitrogen for 30 minutes, and then heated to 44° C. The polymerization is then commenced by the addition of 2 g of the 2% aqueous sodium sulfoxylate formaldehyde solution from the addition funnel. Then the reaction temperature reaches 48° C., the monomer mix and additions of the sodium sulfoxylate formaldehyde solution are begun and kept at such a rate as to maintain a reaction temperature equal to 52°±2° C. After 30 minutes from the beginning of the monomer addition, the 11.5% maleamic acid solution is added at such a rate as to finish simultaneously with the monomer mix and the sodium sulfoxylate formaldehyde solution. After all the additions are completed, the reaction mixture is maintained at 55° C. for 90 minutes. The product of the reaction is a 37.7% solids latex with a Brookfield viscosity of 200 (Model RVT at 100 rpm Spindle #3).

EXAMPLE III

Preparation of Itaconamic Acid (4-amino-4-oxo-2-methylene butanoic acid).

The procedures of Example 1 are followed exactly except that 229.7 g of itaconic anhydride (2.05 moles) replaces the 200.9 g of maleic anhydride. The isolated product melted at 180°-183° C.

EXAMPLE IV

The procedures of Example II are followed exactly except that 40 g of 11.5% itaconamic acid solution replaces the 82 g of maleamic acid solution. The product is a 27% solids latex with a Brookfield viscosity of 100 cps (Model RVT at 100 rpm Spindle #3).

EXAMPLE V

Web Treatment

A saturation bath is prepared by diluting 15 grams of the latex from Example II with 85 grams deionized water. Sheets of Whatman #4 Chromatography Paper measuring approximately 9" by 7.5" are immersed in a saturation bath, squeezed through a laboratory wringer, dried at room temperature and cured for 2½ minutes at 300° F. The sheets are then tested for increases in wet and dry tensiles over untreated controls. In a similar manner, web samples were prepared also from the latex described in Example IV. The results are presented in the table below wherein tensile measurements were obtained on a Thwing Albert Tensile Tester in accordance with TAPPI Standard Number T 456 m-49. Tensiles were measured cross direction for a wet strip and a dry strip and are expressed in pounds per inch. Pounds/inch may be converted to the standard metric unit of g/15 mm by multiplying by 268.4. The amount of latex applied to the sheet was ten percent by weight of the sheet, except in the case of the control.

| TREATMENT | TENSILES WET | DRY |
|---|---|---|
| Control | 0.9 | 11.0 |
| Example II | 9.7 | 15.7 |
| Example IV | 3.9 | 9.1 |
| Commercial* NMA Latex | 9.0 | 15.8 |

*Made by emulsion polymerization of ethylene, vinylacetate and N—methylol acrylamide (NMA) in a ratio by weight of approximately 14:82:4.

EXAMPLE VI

Repulping

The ease of repulpability of a sheet may be observed as the length of time that it must be slurried in an aqueous NaOH solution in order to completely defiber. Thus, a number of sheets weighing a total of 20 grams are cut into small pieces and added to 80 grams of a 1.875% aqueous NaOH solution. The temperature of the resulting slurry is brought to 95° C. (200° F.) and held there until the sheet has been completely fiberized. Complete fiberization is achieved when all fiber aggregates have been reduced to individual fibers.

| TREATMENT | TIME FOR COMPLETE FIBERIZATION |
|---|---|
| Example II | 30 minutes |
| Commercial NMA Latex | 4 hours |

While the invention has been particularly described with reference to preferred embodiments thereof, it is understood that various other changes and modifications thereof will occur to a person skilled in the art without departing from the spirit and scope of the invention as defined by the appended claims.

What is claimed is:

1. A cellulosic fibrous non-woven web wherein the cellulose fibers are chemically modified by a cross-linking reaction with a binder comprising a copolymer latex of a monomer which is a polymerizable half-acid, half-amide corresponding to the following general formula:

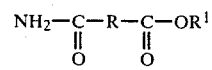

wherein R is a hydrocarbon chain containing a multiple bond capable of radical polymerization and $R^1$ is H and at least one other ethylenically unsaturated monomer.

2. The web according to claim 1 wherein the half-acid, half-amide corresponding to the general formula is maleamic acid.

3. The web according to claim 1 wherein the half-acid, half-amide corresponding to the general formula is fumaramic acid.

4. The web according to claim 1 wherein the half-acid, half-amide corresponding to the general formula is itaconamic acid.

5. The web according to claim 1 wherein the other ethylenically unsaturated monomer comprises a vinyl ester of an aliphatic acid having one to ten carbon atoms.

6. The web according to claim 5 wherein said monomer is vinyl acetate.

7. The web according to claim 6 wherein the copolymer further includes esters of acrylic or methacrylic acids.

8. The web according to claim 1 wherein the half-acid, half-amide comprises from 1 to 20% by weight of the copolymer.

9. The web according to claim 8 wherein the half-acid, half-amide comprises from 2 to 10% by weight of the copolymer.

10. In a papermaking process, the step of re-pulping a cellulosic fibrous web wherein the cellulose fibers are chemically modified by a cross-linking reaction with a binder comprising a copolymer latex of a monomer which is a polymerizable half-acid, half-amide corresponding to the following general formula:

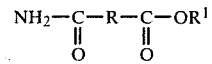

wherein R is a hydrocarbon chain containing a multiple bond capable of radical polymerization and $R^1$ is H and at least one other ethylenically unsaturated monomer.

11. The process in accordance with claim 10 wherein said repulping is carried out within 60 minutes in an aqueous alkaline solution at a temperature range of 150° to 200° F.

* * * * *